US008826183B2

(12) United States Patent
Clauson

(10) Patent No.: US 8,826,183 B2
(45) Date of Patent: Sep. 2, 2014

(54) DYNAMIC MENU REORDERING

(75) Inventor: Todd A. Clauson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 12/905,925

(22) Filed: Oct. 15, 2010

(65) Prior Publication Data
US 2011/0029929 A1 Feb. 3, 2011

Related U.S. Application Data

(63) Continuation of application No. 10/444,630, filed on May 23, 2003, now abandoned.

(51) Int. Cl.
| | | |
|---|---|---|
| G06F 3/048 | (2013.01) | |
| G06F 3/0482 | (2013.01) | |
| G06F 9/445 | (2006.01) | |
| G06F 3/01 | (2006.01) | |

(52) U.S. Cl.
CPC .......... *G06F 3/0482* (2013.01); *G06F 9/44505* (2013.01)
USPC ............ 715/843; 715/810; 715/811; 715/826

(58) Field of Classification Search
CPC .................. G06F 17/30884; G06F 17/30011; G06F 17/30882; G06F 3/0482; G06F 17/211; G06F 17/24; G06F 17/30994
USPC .......... 715/816, 825, 826, 831, 843, 810, 811
See application file for complete search history.

(56) References Cited

U.S. PATENT DOCUMENTS

| | | | | |
|---|---|---|---|---|
| 5,606,669 | A * | 2/1997 | Bertin et al. .................. | 709/223 |
| 5,897,670 | A | 4/1999 | Nielsen | |
| 5,917,491 | A * | 6/1999 | Bauersfeld .................... | 715/810 |
| 6,002,402 | A | 12/1999 | Schacher | |
| 6,184,886 | B1 * | 2/2001 | Bates et al. ................... | 715/760 |
| 6,334,145 | B1 * | 12/2001 | Adams et al. ................. | 709/217 |
| 6,408,316 | B1 * | 6/2002 | Himmel et al. ............... | 715/206 |
| 6,437,805 | B1 | 8/2002 | Sojoodi et al. | |
| 6,476,827 | B1 * | 11/2002 | Porter ........................... | 715/738 |
| 6,498,613 | B1 * | 12/2002 | Wajima ......................... | 715/775 |
| 7,051,117 | B2 * | 5/2006 | McGee et al. ................ | 709/245 |
| 7,107,548 | B2 * | 9/2006 | Shafron ........................ | 715/826 |
| 7,111,009 | B1 | 9/2006 | Gupta et al. | |
| 7,113,168 | B2 * | 9/2006 | Oya et al. ...................... | 345/157 |

(Continued)

OTHER PUBLICATIONS

Chinese Patent Application No. 03160280.0—Reexamination Rejection Decision issued on May 27, 2010 by State Intellectual Property Office of the People's Republic of China, 5 pgs.

(Continued)

Primary Examiner — Nicholas Augustine
(74) Attorney, Agent, or Firm — Trop, Pruner & Hu, P.C.

(57) ABSTRACT

In one embodiment, dynamic menu reordering of a menu is effected by presenting a plurality of menus; receiving a menu selection; in response to the menu selection, presenting a plurality of menu options, each of which menu options occupies a respective menu position; receiving reordering information; and in response to the reordering information, reordering at least one menu position occupied by a respective memory option. In an additional embodiment, menu-option position information is retained in accordance with reordering information; and upon a subsequent menu selection, menu options are presented so that at least one menu option occupies a user-defined position.

8 Claims, 4 Drawing Sheets

(56) References Cited

U.S. PATENT DOCUMENTS

| | | | | |
|---|---|---|---|---|
| 7,143,193 | B1* | 11/2006 | Abbott et al. | 709/248 |
| 7,376,696 | B2* | 5/2008 | Bell et al. | 709/203 |
| 7,386,792 | B1* | 6/2008 | Bascom et al. | 715/205 |
| 7,406,656 | B2* | 7/2008 | Schroeder | 715/205 |
| 7,555,721 | B2* | 6/2009 | Wassom et al. | 715/745 |
| RE43,751 | E* | 10/2012 | Tange | 709/217 |
| 2004/0059755 | A1* | 3/2004 | Farrington et al. | 707/200 |
| 2004/0170309 | A1* | 9/2004 | Hughes et al. | 382/128 |
| 2004/0179017 | A1* | 9/2004 | Martyn et al. | 345/536 |
| 2004/0212640 | A1* | 10/2004 | Mann et al. | 345/792 |
| 2005/0198584 | A1* | 9/2005 | Matthews et al. | 715/779 |

OTHER PUBLICATIONS

Chinese Divisional Patent Application No. 201010270080.4—First Office Action issued on Apr. 20, 2011 by State Intellectual Property Office of the People's Republic of China, 7 pgs.

Chinese Divisional Patent Application No. 201010270080.4—Third Office Action issued on Oct. 16, 2012 by State Intellectual Property Office of the People's Republic of China, 13 pgs.

* cited by examiner

DYNAMIC MENU REORDERING

CROSS REFERENCE TO RELATED APPLICATIONS

This application is a continuation of U.S. patent application Ser. No. 10/444,630 filed May 23, 2003 now abandoned and entitled, "DYNAMIC MENU REORDERING", presently pending. This application is entirely incorporated by reference.

BACKGROUND

The invention relates generally to computer systems and, more particularly, to the design and operation of menus that may be included in, for example, a graphical user interface.

A graphical user interface (GUI) is a familiar and salutary attribute of many contemporary computer operating systems, such as a Windows®-based operating system (Windows OS). Windows OSs run on a number of hardware platforms, including handheld personal computers (PCs), desktop PCs, workstations, and network servers, for example.

When running an application in a Windows OS, a user is frequently presented with a sequence of screen displays that in turn may incorporate one or more windows. Frequently a screen, or a window, presents a user with a number of menus that are identifiable by textual labels or by icons. Commonly, menus are arranged in a menu bar that comprises a plurality of related menus. Menus may be selected by a user with, for example, a mouse or a keyboard. When a menu is selected, the Windows OS responds by presenting a set of menu options that constitute the user-selected menu. The menu options may be presented in the form of a drop-down menu that emanates from a selected menu. The drop-down menu in turn comprises a plurality of menu options, usually arranged in a vertical stack. Menu options remain available for so long as the user holds the menu open.

As an example of the use of a menu-driven GUI, assume that a PC user is running a word-processing application. The application menu bar likely includes, among other menus, a File menu. Selection of the File menu by the user results in the presentation of a drop-down menu that includes menu options (commands) such as Cut, Copy, Paste and Replace. Selection by the user of one the aforementioned menu options causes the PC to perform a corresponding word-processing operation.

In addition to the notable contribution made by menu-driven GUIs to the use of application programs, GUIs have also found widespread relevance in the design of application development systems. GUIs render the application development process significantly more tractable and, for at least this reason, have become an essential feature of many visual programming languages.

However, regardless the context, the use of menu bars and menu options, as heretofore available, suffers from a degree of immutability. That is to say, once a software application is programmed, the arrangement of menus in a drop-down menu is not susceptible to customization by a user. Each menu option occupies a fixed, or static, position in the drop-down menu. Rather than merely representing a failure to satisfy a particular user's idiosyncratic preferences, the imposition of static menu-option positions may constitute a significant operational shortcoming. As a case in point, consider the plight, not entirely hypothetical, of a software developer working in the Visual C++ Integrated Development Environment (IDE). When the developer selects the Visual C++ IDE "Compile" menu, he is presented with a static arrangement of menu options that include the "Compile" and "Recompile All" options in static menu-option positions. Selection of the "Recompile All" option causes all source code in an entire application to be converted to object files. In addition, requisite links between object files are established so that a complete executable is created. Conversely, the "Compile" option results in the compilation (or recompilation) into object code of only the specific code then under development or modification. The static sequence of menu options has been found to occasionally predispose the developer to the inadvertent selection of the "Recompile All" option, even though the "Compile" option was in fact intended. As a consequence of the unintended menu selection, a full recompile is precipitated that consumes an inordinate amount of processing time (in one situation, up to a half hour), even though the developer's objective was simply to build an executable of only the code then under development.

Accordingly, a technique is required that circumvents the opportunity for inadvertent or unintended selection by a user of menu options.

BRIEF DESCRIPTION OF THE DRAWINGS

The subject dynamic menu reordering technique may be better understood by, and it many features, advantages and capabilities made apparent to, those skilled in the art with reference to the Drawings that are briefly described immediately below and attached hereto, in the several Figures of which identical reference numerals (if any) refer to identical or similar elements, and wherein.

Figure 1:
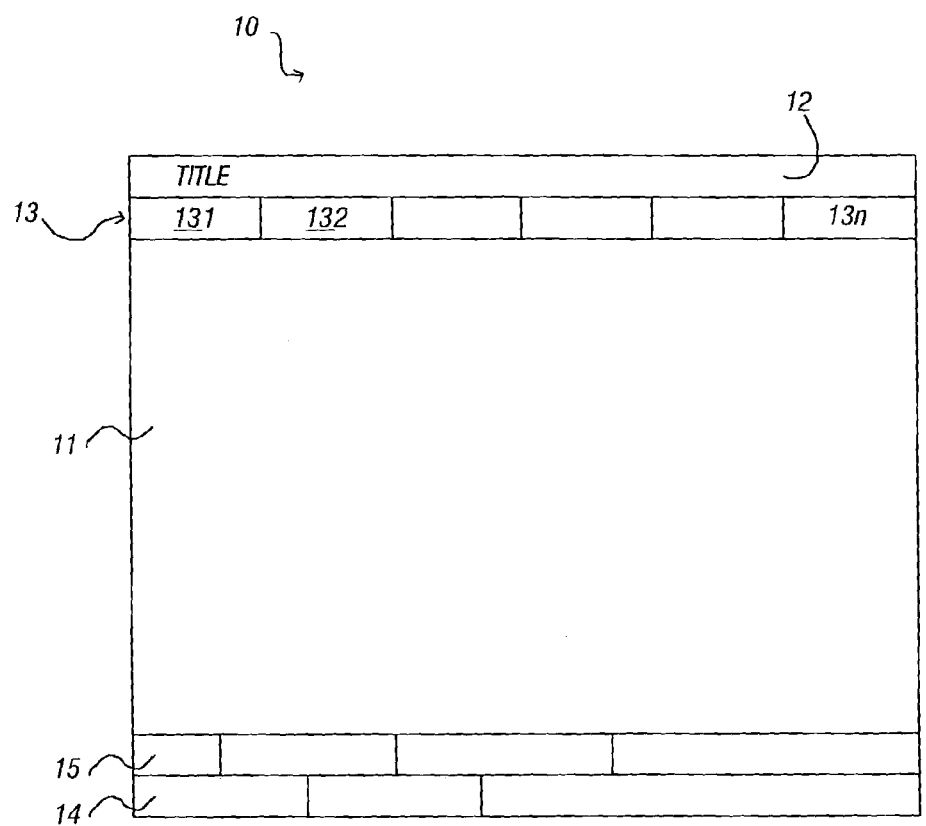
FIG. 1 is a graphical depiction of screen, or window, that may be encountered while running an application in a Windows OS.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

In one embodiment, a technique is provided for dynamically reordering positions occupied by respective menu options that may be included in a drop-down menu format. For example, a computer system incorporates a menu-driven GUI that receives from a user menu-option reordering information. In response to the menu-option reordering information, the PC system reorders at least one menu option from its respective static position to a dynamic user-defined position. User-defined dynamic position information may be saved in a configuration file so that a subsequent selection of the menu causes the drop-down menu to be presented with menu-option positions that conform to user preferences.

In one embodiment, the menu-driven GUI may be an attribute of a software application that is run on a Windows OS. When running such an application, a user is frequently presented with a sequence of screen displays that are similar to screen display 10 depicted in FIG. 1. In canonical form, screen display 10, which may be representative of a screen display encountered as a software application is opened or operated, for example, comprises a work space 11, title bar 12, menu bar 13, status bar 14 and task bar 15. As is well known, title bar 12 occupies a horizontal space at the top of a window and contains the name (title) of the window. Title bar 12 may also contain boxes or buttons (not shown) for closing and resizing the window. Status bar 14 occupies a horizontal space at the bottom of a window that contains a text message pertinent to the prevailing condition of the then-executing program. More relevant for purposes here, menu bar 13 may assume the form of a horizontal rectangular box positioned on the window immediately below title bar 12.

Figure 2A:
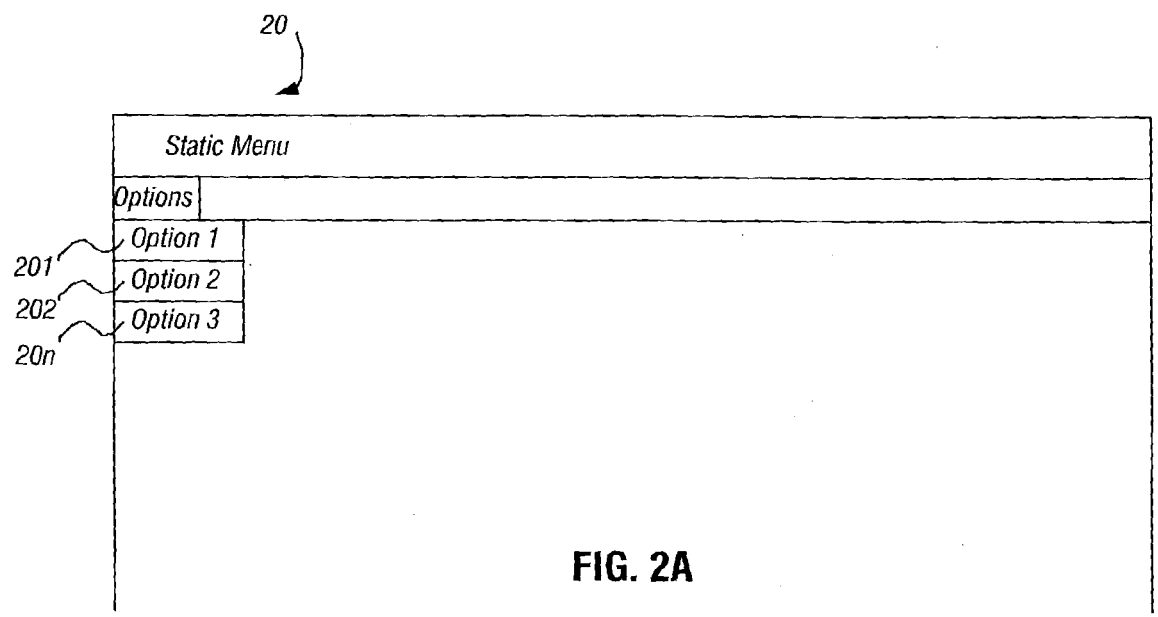
FIG. 2A is a graphical depiction of a screen that results when a menu selection results in the presentation of a static drop-down menu that comprises a plurality of menu options.

Menu bar 13 may comprise a plurality of menus 131, 132, ..., 13n etc. that may be selected by a user with, for example, a mouse or a keyboard. Generally, when a menu is selected, the Windows OS responds by presenting a set of static menu options that constitute the user-selected menu. The menu options may be presented in the form of a drop-down menu 20, such as is depicted in FIG. 2A, that emanates from a selected menu. Drop-down menu 20 comprises a plurality of menu options 201, 202, ..., 20n that remain available for so long as the user holds the menu open. In FIG. 2A, the menu options appear in a vertical sequence as Option 1, Option 2, and Option 3. Of course drop-down menu 20 may comprise greater or fewer than three menu options, and three menu options are shown in a manner intended to be illustrative and to promote brevity and clarity. The menu-options positions of FIG. 2A are "static" in the sense that those positions reflect a priori design and programming of the GUI and are not necessarily coincide with a user's preferred positions for one or more of the menu options.

Figure 2B:
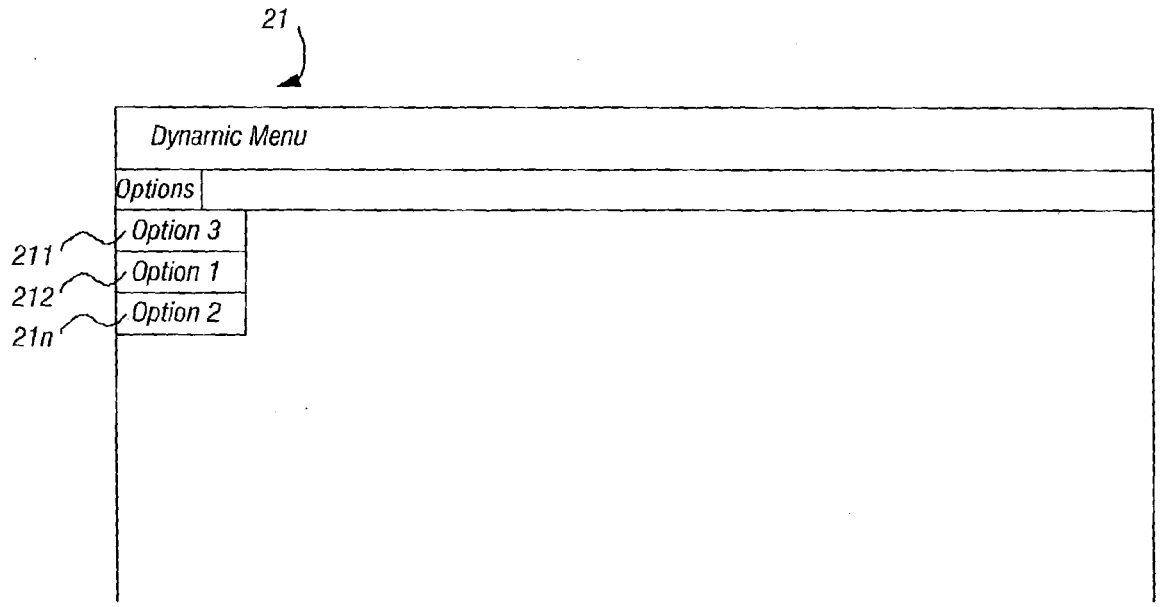
FIG. 2B is a graphical depiction of a screen in which menu-option positions have been reordered in accordance with an embodiment of the invention.

Conversely, FIG. 2B depicts a dynamic (i.e., user-reordered) menu 21 in which the menu-option positions have been reordered by the user, or in response to user-provided information, in a manner that reflects a user's preferences or predispositions. Note that in the menu of FIG. 2B, Option 3, which had occupied the bottom position in the static menu, is reordered so as to occupy the top position in the dynamic menu 21 of FIG. 2B. That is, Option 3 occupies position 211 in menu 21; and Option 2 and Option 3 are pushed down to reordered positions 212 and 21n, respectively.

Figure 3:
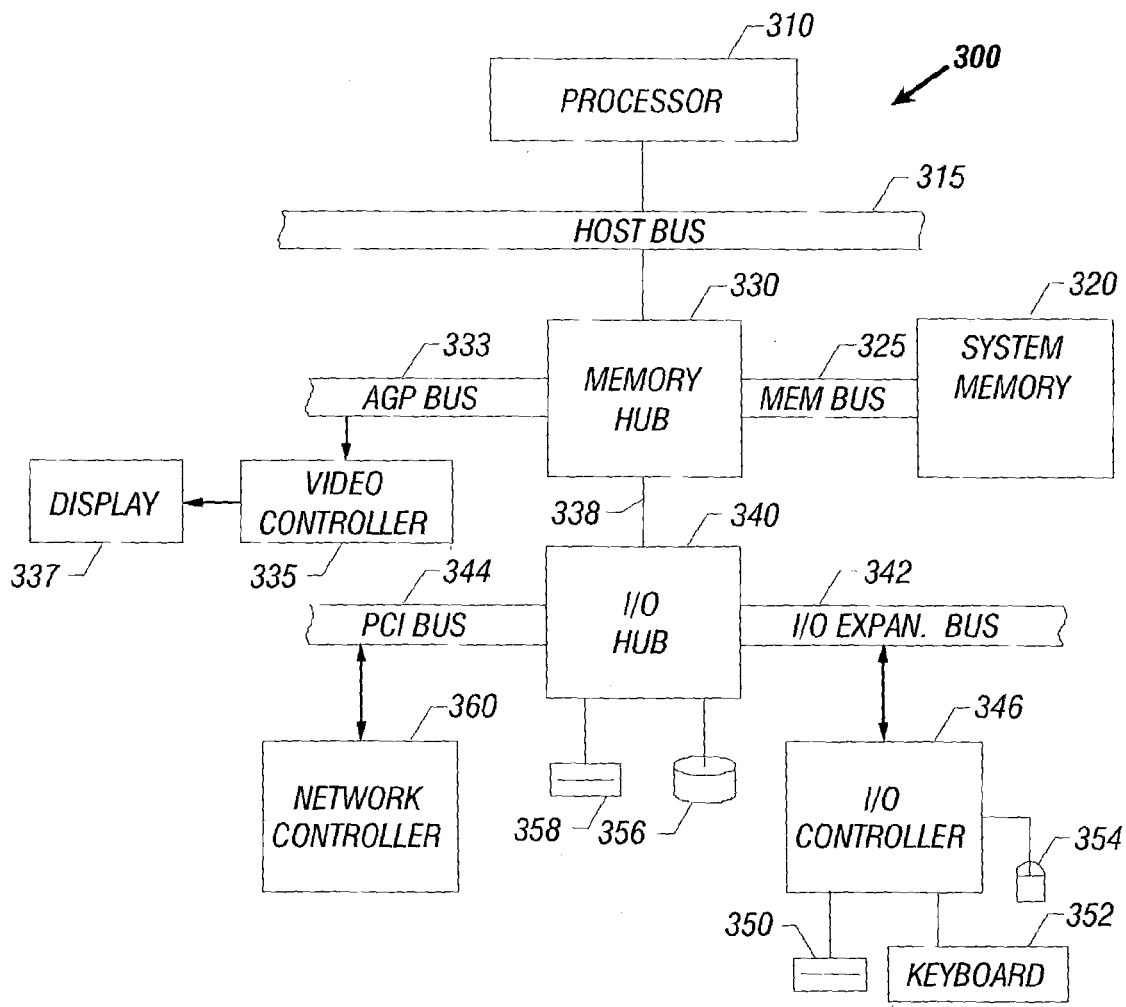
FIG. 3 is a system block diagram of a computer system in accordance with an embodiment of the present invention.

The capability to dynamically reorder menu-option positions is considered to represent a valuable enhancement to many types of computer systems, including but not limited to the computer system depicted in FIG. 3.

With specific reference now to FIG. 3, in one embodiment, computer system 300 is seen to include a processor 310, which may include a general-purpose or special-purpose processor. Processor 310 may be realized as a microprocessor, microcontroller, ASIC, a programmable gate array (PGA), and the like. As used herein, the term "computer system" may refer to any type of processor-based system, such as a mainframe computer, a desktop computer, a server computer, a laptop computer, an appliance, a set-top box, or the like.

In one embodiment, processor 310 may be coupled over a host bus 315 to a memory hub 320, which, in turn, may be coupled to a system memory 330 via a memory bus 325. Memory hub 320 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

Memory hub 320 may also be coupled (via a hub link 338) to an input/output (I/O) hub 340 that is coupled to a input/output (I/O) expansion bus 342 and to a Peripheral Component Interconnect (PCI) bus 344, as defined by the PCI Local Bus Specification, Production Version, Revision 2.1 dated in June 1995. The I/O expansion bus 342 may be coupled to an I/O controller 346 that controls access to one or more I/O devices. As shown in FIG. 3, these devices may include in one embodiment storage devices, such as a floppy disk drive 350 and input devices, such as keyboard 352 and mouse 354. I/O hub 340 may also be coupled to, for example, hard disk drive 356 and compact disc (CD) drive 358, as shown in FIG. 3. It is to be understood that other storage media may also be included in computer system 300.

In an alternate embodiment, the I/O controller 346 may be integrated into the I/O hub 340, as may other control functions. PCI bus 344 may also be coupled to various components including, for example, a network controller 360 that is coupled to a network port (not shown).

Additional devices may be coupled to the I/O expansion bus 342 and to PCI bus 344. Such devices include an input/output control circuit coupled to a parallel port, serial port, a non-volatile memory, and the like.

Although the Description above makes reference to specific components of the system 300, it is contemplated that numerous modifications and variations of the described and illustrated embodiments may be possible. For example, a host bridge controller and system bridge controller may provide functions that are equivalent to the functions provided by memory hub 320 and I/O hub 340. In addition, any of a number of bus protocols may be implemented.

Figure 4:
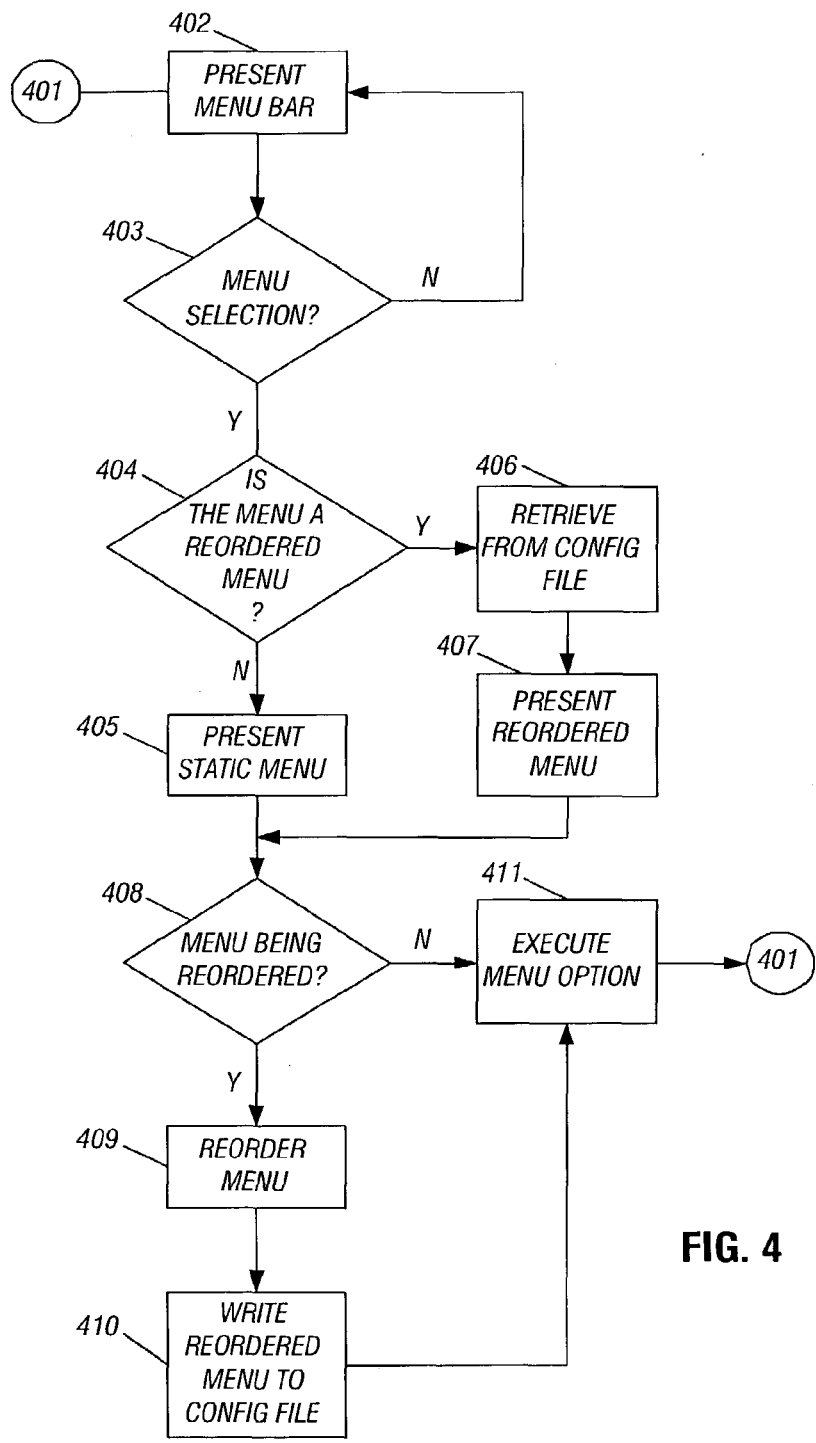
FIG. 4 is a flow diagram of a technique for effecting dynamic menu reordering in accordance with the subject invention.

In the context of the above-described computer system 300, a thorough comprehension of one embodiment of the invention may be extracted from FIG. 4, which constitutes a flow diagram that illustrates an example of the manner in which dynamic reordering of menu options may be realized in accordance with one embodiment of the invention. At a point 401 in a user's operation of GUI-based application (which may correspond, for example, to the opening of the application) the user initiates an action that, at 402, causes the presentation of a menu bar that comprises several menus. At 403 a menu selection by the user is awaited. Subsequent to a user's selection of a menu, which in one embodiment may be effected by a mouse click, a determination is made at 404 whether the user has selected a menu that has been the target of a previous menu-option reordering. If so, the specified reordering is, at 406, retrieved from storage. User-defined menu-position reordering information may be conveniently stored, for example, in a configuration file. The menu options that constitute the user-selected menu are then presented to the user in reordered positions on a screen display. If the subject menu had not been the target of an antecedent user-defined reordering, then at 405 the static menu-option order is presented to the user.

In either case, after the menu options are presented, the process remains attentive at 408 to a then-present desire by the user to effect (an initial or additional) menu-option reordering. Such menu-option reordering is conveyed by the user in the form of transmission of menu-reordering information. In one embodiment, menu-reordering information is conveyed by the user by dragging the menu option in question from its then-existing position (which may be a either a static position or a previously reordered position) in the hierarchy of menu-option positions to a position that conforms to the user's preferences. For example, with allusion to the hypothetical postulated above, an application developer might move the "compile" option to the first or other prominent position in the drop-down menu.

A drag-and-drop protocol for menu-option reordering is deemed favorable inasmuch as most operating system implementations associate a drag-and-drop property with menu options and, accordingly, include software logic to service a drag-and-drop user input. However, be aware that the scope of the invention is not constrained to the user's provision of menu-position reordering information in the form of a drag-and-drop input. Menu-reordering information may be provided by the user in any manner now known or hereafter developed.

In one embodiment, feedback may be provided to the user that the menu-reordering request is being processed by the computer system. Specifically, in one embodiment as the user selects (for example, by a mouse click) a menu option that is desired to be reordered, the menu option is highlighted. A phantom depiction of the selected menu appears as the menu is dragged across the screen until the option is positioned at the intended reordered position. When the selected menu option is properly in position, the corresponding textual label or icon appears at the reordered position. When the mouse click is released, the menu option to be reordered appears at the new position, and the respective positions of other menu options are relocated. For example, in a drop-down menu, the menu options may simply be pushed down in the vertical stack of menu options.

If a reordering request is not detected, then the selected menu option is executed at 411. Conversely, if menu-option reordering is detected, then menu options are reordered at 410 in accordance with user-provided reordering information. At 410, the reordered state of the selected menu options is retained. In one embodiment, as suggested above and illustrated in FIG. 4, menu option reordering information may be retained by saving the user's preferred order in a configuration file. Alternatively, the user's preferences may be instantiated through the operation of self-modifying software. However, the invention is not confined to a particular technique used for the retention of user menu-option order preferences. Subsequently, again at 409, a selected menu option is executed.

Sample pseudocode is presented immediately below that may be used to implement menu-option reordering in an object-oriented programming language based on the Microsoft Foundation Classes:

```
Class MyMenu inherit from CMainFrame
{
    bool DragHappening( );
    bool loadLastStateFile( );
}
bool MyMenu::DragHapping( )
{
    //the user has already begun to drag the menu,
that is why we are here
    DetectWhereDropped(...)//when the dragging ended
find out where the item was placed
    UpdateMenuFile(...) //write the state of where this
option was placed, used during next load
}
bool MyMenu::LoadLastStateFile( )
{
    if(DoesFileExist)
    {
        Loadlaststateinfo( ); //since we have a file,
load its values
        DrawNewMenu( ); //once loaded go ahead and
draw the menu replacing the static menu
    }
}
...
```

In at least some embodiments, the capability, as disclosed herein, to dynamically reorder menu options represents an undeniable benefit to users of GUI-based software applications for work processing, spreadsheet, database, presentation, and other familiar purposes. However, as suggested above, dynamic menu reordering is at least equally beneficial to presumably more sophisticated classes of computer users, such as application software developers. Historically, application developers have plied their trade through manipulation of high-level text-based programming languages such as BASIC, C, FORTRAN, Pascal, COBOL and the like. However, more recently, visual programming languages have supplanted text-based languages in application development, largely because visual programming languages eliminate a level of abstraction between the programming task at hand and an applicable software solution. Because state-of-the-art visual programming languages are inherently menu-driven, the availability of a user-defined menu-option reordering capability is likewise propitious in this environment.

In the Description above, the invention has been set forth in the context of specific embodiments, in a manner that is intended to be illustrative and to convey a thorough comprehension of the invention. However, one of ordinary skill in the art pertaining to the design and operation of software and computer systems will appreciate that various modifications and changes may be imparted to the specifically described embodiments without departure from the scope of the invention.

For example, the invention has, for convenience, been here described largely in the context of Windows OS. However, the dynamic menu reordering technique described here in compatible with numerous operating systems, now existing or hereafter developed. Furthermore, the invention may be applied to menu formats other than the drop-down menu format. In addition, menu-reordering information may be supplied by the user in a form other that a mouse click or keyboard entry; and reordering information need not be provided contemporaneously with the user's operation of the software in question.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-executed method comprising:
    storing in a computer memory, a graphical user interface application including a static arrangement of menu items including menu option order information for a plurality of options located in a drop-down menu, the order being preprogrammed in the application by the application developer, the menu option order information providing a top-to-bottom positional order of the plurality of options in the drop-down menu, wherein a first option of the plurality of options occupies an original position in the top-to-bottom order;
    in response to a user providing a modified order of the application developer's programmed static arrangement of options, said application changing the order of the plurality of options in the drop-down menu, wherein the changed order causes the first option to occupy a different position from the original position in the drop-down menu and storing said changed order in a configuration file separate from said application, but accessible by said application; and in response to a user selecting the drop-down menu, said application checking to determine whether the static arrangement has been modified, and, if so, locating the changed order in the configuration file and subsequently displaying the drop-down menu in the changed order stored in the configuration file and if no change to the static arrangement is detected, said application displaying the static arrangement.

2. The method of claim 1, further comprising:

presenting a plurality of menus;

receiving a menu selection; and in response to the menu selection, presenting a plurality of menu options, wherein at least one menu option occupies a menu position determined by the menu-option reordering information.

3. The method of claim 2, wherein the menus are presented in the form of a menu bar.

4. The method of claim 2, wherein the plurality of options are presented in the form of a drop-down menu.

5. A non-transitory machine-readable medium having stored thereon instructions, which if executed by a machine causes the machine to perform a method comprising:

storing a graphical user interface application including a static arrangement of menu items including menu option order information for a plurality of options located in a drop-down menu, the order being preprogrammed in the application by the application developer, the menu option order information providing a top-to-bottom positional order of the plurality of options in the drop-down menu, wherein a first option of the plurality of options occupies an original position in the top-to-bottom order;

in response to a user providing a modified order the application developer's programmed static arrangement of options, said application changing the of the plurality of options in the drop-down menu, wherein the changed order causes the first option to occupy a different position from the original position in the drop-down menu and storing said changed order in a configuration file separate from said application, but accessible by said application; and in response to a user selecting the drop-down menu, said application checking to determine whether the static arrangement has been modified, and, if so, locating the changed order in the configuration file and subsequently displaying the drop-down menu in the changed order stored in the configuration file and if no change to the static arrangement is detected, said application displaying the static arrangement.

6. The machine-readable medium of claim 5, wherein the performed method further comprises:

presenting a plurality of menus;

receiving a menu selection; and in response to the menu selection, presenting a plurality of menu options, wherein at least one menu option occupies a menu position determined by the menu-option reordering information.

7. The machine-readable medium of claim 6, wherein the menus are presented in the form of a menu bar.

8. The machine-readable medium of claim 6, wherein the plurality of options are presented in the form of a drop-down menu.

\* \* \* \* \*